Feb. 14, 1950  J. H. MAYBERRY  2,497,364
MUSIC CHORD INDICATOR AND TRANSPOSING DEVICE
Filed Feb. 10, 1945
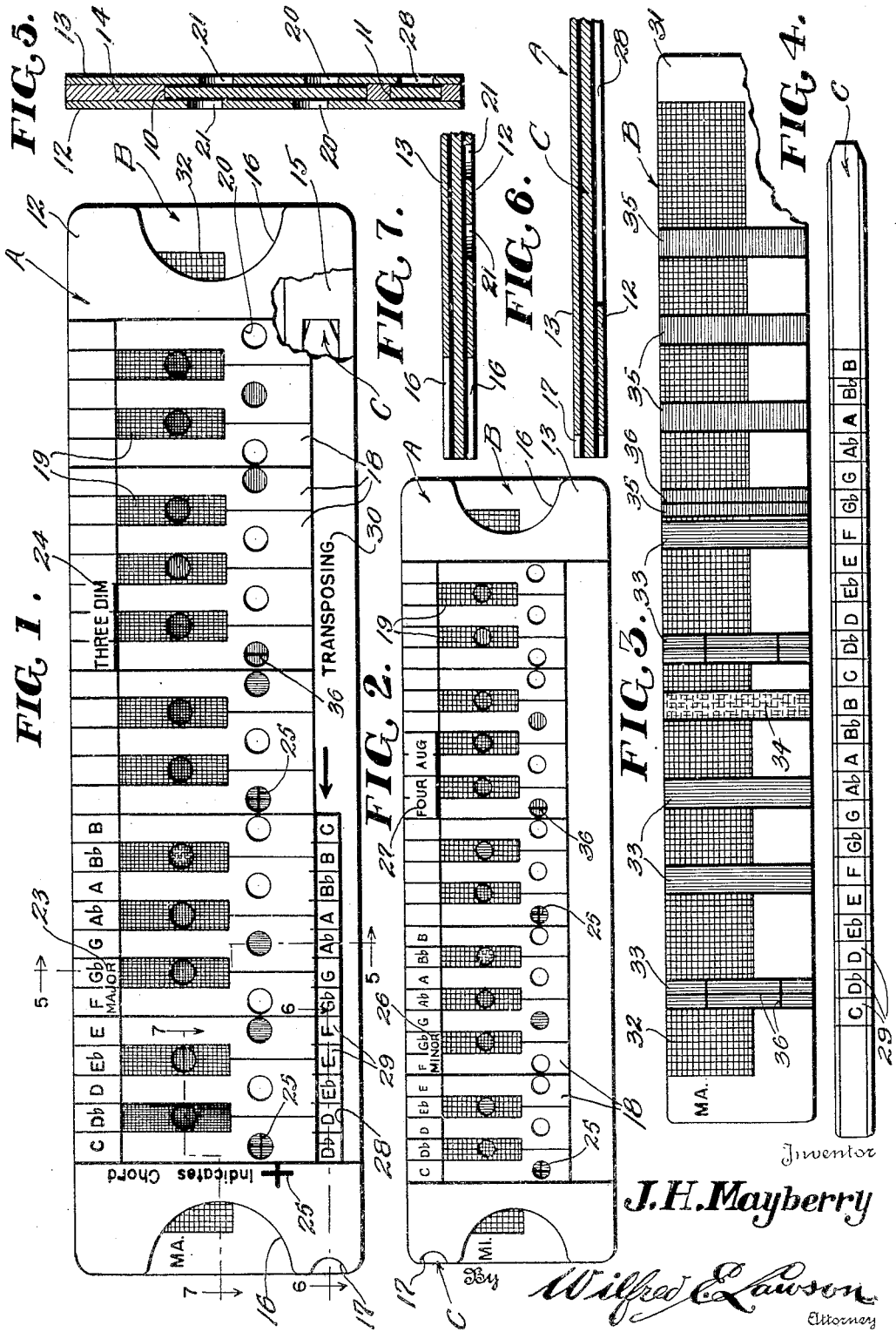
Inventor
J. H. Mayberry
By Wilfred E. Lawson
Attorney Patented Feb. 14, 1950

2,497,364

UNITED STATES PATENT OFFICE 2,497,364

MUSIC CHORD INDICATOR AND TRANSPOSING DEVICE

John H. Mayberry, Washington, D. C.

Application February 10, 1945, Serial No. 577,226

1 Claim. (Cl. 84—473)

This invention relates generally to the class of music and pertains particularly to instruction or teaching devices.

A principal object of the present invention is to provide a changeable chord indicator which is designed to illustrate clearly the exact keys of the piano keyboard which must be struck to sound any chord desired.

Another object of the invention is to provide a changeable chord indicator which is designed to show at a glance three possible positions of the major and minor chords, to assist the player in shifting from one position to another when required in those instances where the melody of the right hand may interfere with or overlap the bass.

Still another object of the invention is to provide a chord indicator device which shows an exact reproduction to scale of the black and white keys of a piano keyboard through at least two octaves, with means for selectively identifying by distinctive colors, the keys necessary to be played for the sounding of any desired chord and for maintaining unchanged the appearance of each of the other keys which is not distinctively identified.

Still another object of the invention is to provide in a device of the above described character, a shiftable means for illustrating the keys to be played in transposing from one key or intonation to another, for sounding chords in the transposed keys or intonation.

A further and more specific object of the invention is to provide a slide rule type of device having a face of the body portion thereof designed to show a reproduction to scale of a portion of a piano keyboard, with a window formed in the body through each key, and a slide member movable longitudinally of the group of keys and having distinctively marked areas arranged to show through specific openings of the keys, in different positions of the slide, to designate groups of keys to be struck in order to sound any desired chord, and black and white areas for blanking-out the windows respectively of those black and white keys not showing distinctive markings.

The invention will be best understood from a consideration of the following detailed description taken in connection with the accompanying drawing forming a part of the specification, with the understanding, however, that the invention is not confined to a strict conformity with the showing of the drawing but may be changed or modified so long as such changes or modifications mark no material departure from the salient features of the invention as expressed in the appended claim.

In the drawing:

Figure 1 is a view in plan of one side of a device constructed in accordance with the present invention, a portion of the same being broken away.

Figure 2 is a view on a reduced scale of the opposite side of the device from that shown in Figure 1.

Figure 3 is a view in plan of the side of the slide bar used in selecting the major chords, such bar being removed from the body of the device.

Figure 4 is a view in elevation of the face of the slide strip used in connection with transposing.

Figure 5 is a transverse section taken on the line 5—5 of Figure 1.

Figure 6 is a longitudinal section taken on the line 6—6 of Figure 1 through a portion of the length of the device.

Figure 7 is a partial longitudinal section taken substantially on the line 7—7 of Figure 1.

Referring now more particularly to the drawing wherein like numerals of reference designate corresponding parts throughout the several views, it will be seen that the device of the present invention comprises the relatively long body portion which is generally designated A and the two longitudinally shiftable portions constituting a sliding bar generally designated B, and a slide strip which is generally designated C.

While the body A may be formed in any suitable manner to provide the properly proportioned longitudinally extending passages 10 and 11 in which are slidably disposed the bar and strip B and C respectively, it is here illustrated as being made up of the relatively long side wall strips or sheets of material of suitable weight or thickness and designated 12 and 13, which are maintained in spaced parallel relation by the interposed longitudinally extending spacing fillers 14 and 15. These fillers are relatively narrow and are spaced apart to have their outer edges flush with the outer edges of the side wall forming sheets 12 and 13 thus providing between them the relatively wide central longitudinally extending passage 10 which opens through the two ends of the device and which is of a width only slightly greater than the width of the slide bar B which positions therein as shown.

As is also clearly shown in Figures 1 and 2 the bar B is of substantially the same length as the body A and in order to facilitate grasping either end of the bar B between the fingers so that such bar may be shifted as desired, the side walls 12 and 13 at each end of the body are cut out or recessed as indicated at 16. This is the preferred construction but it is to be understood that the invention is not limited thereto as it will be readily obvious that other means may be provided for facilitating the grasping of the slide bar or otherwise effecting its longitudinal movement.

The passage 11 is preferably formed as a slot in the filler 15, from one end thereof and terminating short of the opposite end as shown in Figure 1. The two sides of this slot are covered by the side wall strips or sheets 12 and 13 thus forming the blind passage 11 into which the slide strip C snugly engages. The side wall strips 12 and 13 at the open end of the blind passage 11 in which the slide strip C positions, are recessed as indicated at 17 to facilitate grasping the end of the strip C to draw it outwardly.

Upon each side of the body A there is laid out, to scale, a number of the keys of the piano keyboard, the white keys being designated 18 while the black keys are designated 19. Since the keyboard layout is exactly the same on both sides of the body, the same numerals are used to designate the black and white keys, although the layout on one side of the body is captioned differently from the layout on the opposite side as hereinafter described.

Each side wall strip or sheet 13 and 14 is provided with a plurality of windows, here shown as apertures, 20 and 21, the windows 20 each being formed through a white key while the windows 21 are each formed through a black key. Each of the windows is located upon the longitudinal center of the tail-piece of the key through which it is formed, such tail-pieces being represented along the top of the group of keys, or at the backs of the keys, by the spaces 22. This location of each of the windows upon the longitudinal center of the tail-piece of the key through which it is formed is of particular importance in connection with the construction of the present device because it makes possible the movement of the hereinafter described distinctively designated areas formed on the faces of the slide bar B, the proper distances or intervals for identifying the necessary piano keys to be played to give the different chords.

At one end of each group of keys, each of the spaces 22 has placed therein the proper symbol to designate the tone or note which will be sounded upon striking the adjacent key, the notes through a full octave being thus identified. In this area also, upon one side of the body A, is placed the word or legend "major," designated 23, to indicate that the information given by the device when using this side, is for playing major chords, major chords with 7th and diminished chords.

Upon the same side of the body bearing the legend "major" is the legend "three dim.," as indicated at 24, indicating the illustration of the three positions to show twelve diminished chords.

A symbol, shown as a cross and designated 25, is placed upon the major scale side of the body for use in association with the side bar B as hereinafter described.

Upon the reverse side of the body the minor scale chords are shown and in addition to having the key symbols at the back end of each key, through an octave, the word "minor" is placed on the body as indicated at 26 and adjacent the opposite end of the body the words "four aug." appear to indicate that four position will show the twelve augmented chords. This caption "four aug." is designated 27.

Upon the major chords indicating side of the device, the wall strip or sheet 12 is provided with a window here shown as a slot 28, which extends lengthwise of the body through the extent of the octave in which the keys are identified by the notes or key symbols.

Through the window 28 one side of the slide strip C is visible and this visible side of the slide strip is divided into the areas 29 which are of equal width with the areas 22 and are designed to be aligned with such areas in all positions of use for the strip C.

The areas 29 of the slide strip have the note or key symbols thereon covering at least two octaves.

The word "transposing," designated 30, appears at one side of and on a line with the window 28 to designate that this part of the device is used for the purpose stated.

The slide bar B comprises a strip of material of suitable width and thickness, generally designated 31. As previously stated this band or strip is designed to snugly fit in the passage 10.

The slide bar strip 31 has a white background through the longitudinal area which is presented to the white key windows 20, while the upper portion has a black background, designated 32, through the area presented to the windows 21 of the black keys. This applies to both faces of the slide bar strip 31.

Extending across the black and white background upon each side or face of the slide bar strip is a series of distinctively marked stripes. While these stripes may be marked in any suitable manner for proper distinction it is preferred that they be of certain predetermined and easily distinguished colors. Accordingly the stripes designated 33 are preferably colored red while one stripe is preferably colored orange as indicated at 34, and the remaining stripes 35 are preferably colored blue.

The stripes 33 at the left hand end of the slide bar, upon the side used for designating major chords, are spaced, together with the orange stripe 34, by the key tail-piece indicating spaces or areas 22 so that the movement of the slide bar a necessary distance to shift these stripes from one space 22 to the next space will correspond with the raising or lowering of the notes half a tone.

The first red stripe at the left hand end of the slide bar has extending lengthwise and transversely thereof the crossed lines 36 and when this stripe lies beneath the key of C, a cross will appear in the window 20 which is formed through that key, as shown in Figure 1. A corresponding designation is formed upon the fourth red stripe which, as shown in Figure 1, also appears through the window 20 of the next key of C, when the slide bar B is in what may be termed the normal or starting position, in the passage 10 of the body.

The symbol 25 thus indicates to the user of the device that when such symbol appears through any of the windows, the correspondingly colored stripes which may be seen or viewed through either the windows 20 or the windows 21 within the octave, represent the keys to be struck in order to play or sound the chord indicated at the back or tail end of the key through which the cross is seen. As shown in Figure 1, the chord indicating cross is seen through the window in the key of C and accordingly the correspondingly colored stripes will appear in the octave through the windows formed in the keys of E and G. The windows of the remaining notes in this octave, both black and white, with one exception, will be blanked out by the black and white backgrounds and the user of the device will, accordingly, be advised, at a glance, that the chord of C will be sounded by striking the keys identified by the red dots.

The exception noted has to do with the orange stripe 34 which will be visible through the window of the black key representing the intonation B flat. This indicates to the user of the device, the C 7th tone which may be sounded with the C chord.

By including in the device the octave of the chord and the major 3d above, there is obtained a choice of three positions of the major chord, which is a three note chord. At a glance the user can tell which would be most convenient to play with the melody since it often overlaps or interferes with the bass in certain positions. The 7th is conveniently placed in the same octave since it usually follows the major chord. As previously stated, the stripe representing the 7th is colored distinctively with respect to the other stripes so that it may be readily identified although it is played with the major chord.

The cross symbol appearing upon two of the red stripes not only indicates the chord but also assists in properly centering the colored stripe with respect to the aperture.

As previously stated the slide strip C is used for transposing. The window 28 is of sufficient extent or length to make visible at all times the note identifying letters of one full octave. The octave shown depends upon the position of the slide strip.

To illustrate the use of the device in transposing it will be assumed that the user has a piece of music which is written in the key of G flat and would like to play it in the key of F. By shifting the slide strip C the letter G flat is moved to position in line with the key of F. The user of the device is now ready to transpose the piece of music to F and if he is familiar with all chords it will be unnecessary to make any further moves. It may be seen at a glance that G flat chord will become F; E flat will become D; E will become E flat, etc., and pencil notations may accordingly be made upon the music. Treble may be transposed in the same manner if desired.

If, however, the user of the device is not familiar with all chords in the new key or intonation, when the music calls for G flat, the slide bar B is moved to bring the cross carrying index stripe to position in line with the G flat on the slide strip C and it will at the same time indicate F at the tail end of the key and the keys A and C will at the same time be indicated, thus showing the user of the device that the F chord is made up of the keys of F, A and C.

The method of obtaining the three positions of the major and minor chords together with the 7th is as follows.

Major chords have three tones to the chord, therefore, there are three positions of the chord. The major chord is formed by the 1st, 3d and 5th tones of the major scale. The 1st position is formed when the 1st tone is the lowest note in the chord. The 2d position is formed when the 3d tone is the lowest note in the chord and the 3d position is formed when the 5th tone is the lowest note in the chord. The 2d and 3d positions are most frequently used.

The 7th chord is formed by the addition of the 7th tone to the major chord.

In order to show three positions there is shown an added octave and also a 10th, which is the third tone in the major chord played an octave higher. There is thus obtained the 1st, 3d, 5th, 7th, the octave and the 10th tones of the major scale visible through the apertures.

The minor is shown in the same manner with intervals corresponding to the 1st, flatted 3d, 5th, 7th, octave of the 1st and octave of the flatted 3d.

Augmented chords are formed by the 1st, 3d and sharped 5th of the major scale, a three note chord which may be named for any note in the chord. By using the lower note for a guide and moving four semitones, all twelve augmented chords are shown in the most frequently used positions.

Diminished chords are formed by the 1st, flatted 3d, flatted 5th and 6th tones of the major scale, a four note chord which may be named for any note in the chord. By using the lower note for a guide and moving three semitones, all twelve diminished chords are shown in the most frequently used positions.

The first one of the group of colored stripes or blue stripes used for illustrating the augmented and diminished chords has a black guide line 36 to assist in positioning the slide.

Reference has been made in the specification to "windows" and such windows have been illustrated as being in the form of openings 20 and 21 or an elongated slot 28 but it is to be understood that there is no intention of limiting the invention to the use of openings or apertures in the walls of the body but that it is within the scope of the present invention to make use of transparent areas through which the slide bar faces and the face of the slide strip may be viewed. Such transparent areas may be formed in any suitable manner as, for example, by filling in the openings 20, 21 and 28 with a suitable transparent material such as one of the synthetic resins or the entire device may be made of a suitable resin of transparent character with the keyboard suitably printed thereon and leaving unprinted areas which would provide windows through which the distinctively marked portions of the slides might be made visible.

I claim:

A music chord teaching and transposing device, comprising a relatively long flat body having the black and white keys of a portion of a piano keyboard reproduced upon a side face thereof, said flat body having a relatively long window opening formed therethrough across the front ends of the white keys of the said reproduced keyboard, through the extent of an octave, a relatively long slide member carried by the body upon the side opposite from the side upon which the keyboard is formed and having a face exposed through said window opening, said slide member having formed upon the said face thereof for exposure through said window opening, note letters for at least two octaves to be selectively associated with the adjacent keys, and means identifying those keys of the octave across which the window extends.

JOHN H. MAYBERRY.

REFERENCES CITED

The following references are of record in the file of this patent:

UNITED STATES PATENTS

| Number | Name | Date |
|---|---|---|
| 183,103 | Allison | Oct. 10, 1876 |
| 569,509 | Mueller | Oct. 13, 1896 |
| 605,157 | Wickersham | June 7, 1898 |
| 718,065 | Woods | Jan. 6, 1903 |
| 1,091,598 | Somers | Nov. 31, 1914 |
| 1,091,865 | Scroggs | Mar. 31, 1914 |
| 1,236,339 | Mills | Aug. 7, 1917 |
| 2,332,842 | Champion | Oct. 26, 1943 |

FOREIGN PATENTS

| Number | Country | Date |
|---|---|---|
| 11,688 | Great Britain | Sept. 17, 1898 |
| 250,644 | Germany | Sept. 12, 1912 |
| 12,695 | Great Britain | May 24, 1895 |